C. F. Worch.
Destroying Moths

No. 65,462.  Patented Jun. 4, 1867.

Witnesses;
Theo Tusche
J. A. Service

Inventor;
Chas. F. Worch
Per Munn & Co
Attorneys

United States Patent Office.

CHARLES F. WORCH, OF NEW YORK, N. Y.

Letters Patent No. 65,462, dated June 4, 1867.

---

IMPROVED APPARATUS FOR DESTROYING MOTHS.

---

The Schedule referred to in these Letters Patent and making part of the same.

---

TO ALL WHOM IT MAY CONCERN:

Be it known that I, CHARLES F. WORCH, of the city, county, and State of New York, have invented a new and improved Apparatus for Destroying Moths; and I do hereby declare that the following is a full, clear, and exact description thereof, which will enable others skilled in the art to make and use the same, reference being had to the accompanying drawings forming part of this specification.

The object of this invention is to construct an apparatus wherein moths can be easily destroyed by means of hot air, and wherein furniture and clothing are also prepared in such a manner that they are made incapable to serve again as food for moths.

The invention consists in the use of a spacious box, made of wood or any other suitable material, which is made air-tight, and provided with a furnace and smoke pipe, &c., so that the inside of the box may be heated to about 120° Fahrenheit. Furniture, clothing, or any other material containing moths, can be placed into the box, and is then subjected to the heat for from three to ten hours. The heat is not very intense, but as the box is air-tight, the moisture will be extracted from everything in the box, moths as well as horse-hair or wool. The moths are soon killed by the extreme dryness, and the eggs are, from the same cause, soon completely withered. The moisture in the hair or wool of the clothes or furniture is also extracted, and the same are thereby made unfit to serve as food for the moths, while the heat is not nearly strong enough to affect in the least even the finest politure of the furniture. The apparatus is furthermore so constructed that the heat can be decreased or increased at will, and that the interior of the box may be inspected at any time, so that the progress of the drying process may be watched. In the annexed drawing my invention is illustrated—

Figure 1 being a horizontal sectional view of my improved apparatus, taken in the line $x\ x$, fig. 2.

Similar marks of reference indicate corresponding parts.

Figure 1:
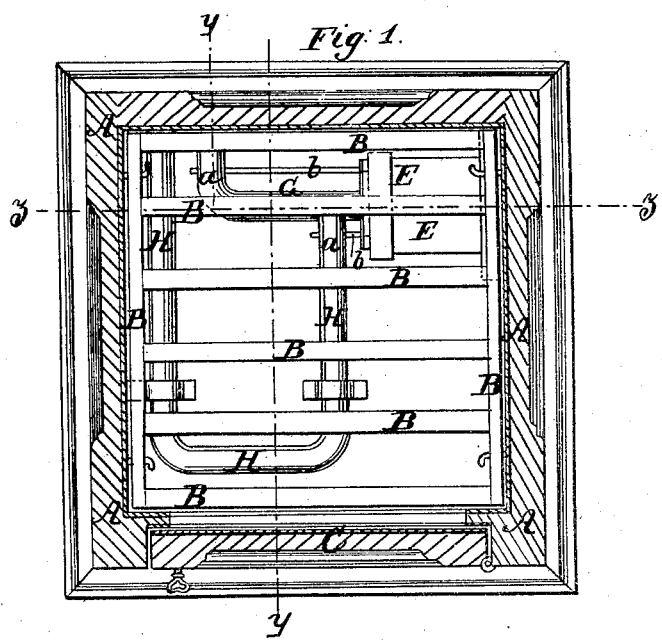
Figure 2:
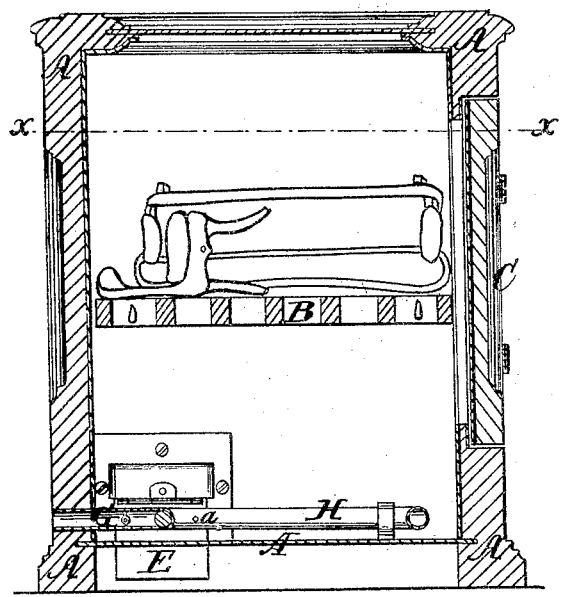
Figure 2 is a vertical cross-section of the same, taken on the line $y\ y$, fig. 1.
Figure 3:
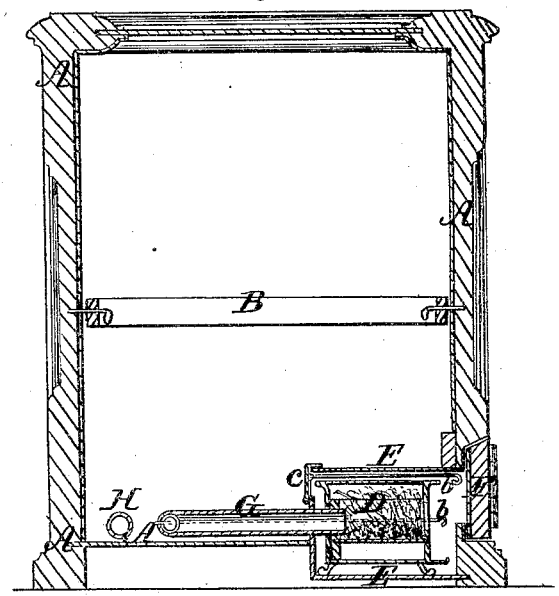
Figure 3 is a similar view, taken on the line $z\ z$, fig. 1.

A represents a box, made of wood or other suitable material, and lined on the inside with sheet metal, paper, or any other suitable material that will keep it air-tight. The box is large enough to be able to hold furniture, such as sofas, chairs, etc., which are laid upon a perforated false bottom, B, arranged within the box. The bottom B may be made of bars, which are laid across the box A, as shown in the drawings. The bottom should furthermore be so arranged as to be easily raised and lowered, so that the furniture may be removed from or placed into the box with facility. Access to the inside of the box is had through a door, C, which, when locked, closes air-tight. The upper surface, or any part of it, or any part of one of the surfaces, may be made of glass, so as to facilitate the inspection of the articles in the box. At any suitable part of the bottom of the box is arranged a furnace or stove, D, which is enclosed in a metal box, E, as shown more particularly in fig. 3. Through a door, F, access may be had to the furnace. The pipes for conducting the smoke from the furnace to the outside lead through the box A, and constitute two branches, G and H, one of which is very short and the other is of considerable length. The smoke can be directed either into the one or the other of these pipes by means of dampers $a\ a$, in the same, which are operated by rods $b\ b$, as shown. When a greater amount of heat is required in the box A, the rear or one of the inner walls $c$ of the box E, can be let down, being hinged, as shown in fig. 3, and then the whole heat of the furnace passes into the box A. When but little heat is required, the door F is opened, and the heat escapes through the same.

I claim as new, and desire to secure by Letters Patent—

1. An apparatus for destroying moths, that is made and operating substantially as herein shown and described.

2. The device for regulating the heat in box A, consisting of the box E, pipes G and H, dampers $a\ a$ and $c$, and door F, all made and operating substantially as herein shown and described.

3. The use of air-tight boxes, in which racks or shelves B are arranged for holding furniture and clothing, from which all the moisture is removed without an excessive heat.

CHARLES F. WORCH.

Witnesses:
 WM. F. MCNAMARA,
 ALEX. F. ROBERTS.